United States Patent [19]

Leger et al.

[11] 4,142,028
[45] Feb. 27, 1979

[54] NONAQUEOUS CELLS UTILIZING ALUMINUM, MAGNESIUM, AND CALCIUM ANODES IN AMIDE-BASED ELECTROLYTES

[75] Inventors: Violeta Z. Leger, North Olmsted; George E. Blomgren, Lakewood, both of Ohio

[73] Assignee: Union Carbide Corporation, New York, N.Y.

[21] Appl. No.: 863,901

[22] Filed: Dec. 23, 1977

[51] Int. Cl.$^2$ ............................................. H01M 6/14
[52] U.S. Cl. ...................................... 429/194; 429/218
[58] Field of Search ............... 429/194, 197, 220, 223, 429/219, 228, 218, 224

[56] References Cited

U.S. PATENT DOCUMENTS

| | | |
|---|---|---|
| 3,639,174 | 2/1972 | Kegelman ............................ 136/20 |
| 3,847,674 | 11/1974 | Kegelman ............................ 136/100 |
| 4,049,892 | 9/1977 | Kronenberg ......................... 429/194 |

FOREIGN PATENT DOCUMENTS

| | | |
|---|---|---|
| 52-330 | 1/1977 | Japan. |
| 52-331 | 1/1977 | Japan. |
| 52-332 | 1/1977 | Japan. |
| 52-72425 | 6/1977 | Japan. |
| 52-73328 | 6/1977 | Japan. |
| 52-73329 | 6/1977 | Japan. |

Primary Examiner—Charles F. LeFevour
Attorney, Agent, or Firm—Cornelius F. O'Brien

[57] ABSTRACT

A nonaqueous cell employing an anode of aluminum, magnesium, calcium or their alloys in which at least the surface of the anode is amalgamated, a solid cathode and an electrolyte comprising a salt such as lithium or ammonium salt dissolved in an aprotic alkylated amide solvent.

13 Claims, 10 Drawing Figures

NONAQUEOUS CELLS UTILIZING ALUMINUM, MAGNESIUM, AND CALCIUM ANODES IN AMIDE-BASED ELECTROLYTES

FIELD OF THE INVENTION

The invention relates to a solid cathode nonaqueous cell employing an anode of aluminum, magnesium, calcium or an alloy thereof in which at least the surface of the anode is amalgamated and an electrolyte comprising a salt such as a lithium or ammonium salt dissolved in an aprotic alkylated amide solvent.

BACKGROUND OF THE INVENTION

The continuing development of portable electrically powered devices, such as tape recorders and playback machines, radio transmitters and receivers, and the like, creates a continuing demand for the development of reliable, long service life cells or batteries for their operation. Recently developed electrochemical cell systems that will provide a long service life utilize highly reactive anode materials, such as lithium or the like, in conjunction with high energy density liquid cathode materials or solid cathodes and nonaqueous electrolytes. However, lithium, because of its chemical reactivity, is difficult to handle and, therefore, could result in production problems if not handled properly. Light metals, such as aluminum, magnesium and calcium, have a high energy density that would appear to make them candidates as anodes for use in nonaqueous cells. These metals have a protective oxide film which allows them to be handled in a normal atmospheric environment but, however, the oxide film renders them inactive in nonaqueous electrolytes. In an article by P. A. Malachesky in "Encyclopedia of Electrochemistry of the Elements", A. J. Bard Ed., Marcel Dekker, Inc., N. Y., 1976, pp 64–165, it concludes that "Despite the technological impetus of successful aluminum electrodeposition from organic-based electrolyte systems . . . , the use of Al in organic electrolyte-based battery systems has not met with much success."

It is the primary object of this invention to provide a nonaqueous cell employing an anode of aluminum, magnesium, calcium or their alloys, and wherein at least the surface of the anode is amalgamated.

Another object of the present invention is to provide a metal oxide or fluoride cathode nonaqueous cell employing an anode of aluminum, magnesium, calcium or their alloys in which at least the surface of the anode is amalgamated.

Another object of the present invention is to provide a nonaqueous cell having an anode in which at least its surface is amalgamated, a solid cathode and an electrolyte comprising a salt, such as a lithium or ammonium salt, dissolved in an aprotic alkylated amide solvent.

Another object of the present invention is to provide a nonaqueous cell having an anode in which at least its surface is amalgamated, a metal oxide or fluoride cathode and an electrolyte comprising a salt, such as a lithium or ammonium salt, dissolved in an aprotic alkylated amide solvent.

The foregoing and additional objects will become more fully apparent from the following description.

SUMMARY OF THE INVENTION

The invention relates to a nonaqueous cell comprising an anode selected from the group consisting of aluminum, magnesium, calcium and their alloys and wherein at least the surface of said anode is amalgamated; a solid cathode; and an electrolyte solution comprising a salt, such as a lithium or ammonium salt, dissolved in a nonaqueous solvent such as an aprotic alkylated amide with or without a cosolvent.

As used herein, amalgamation of at least the surface of the metal anode shall mean the formation of an alloy of the metal with mercury on the surface of the metal so as to render the surface active for use in nonaqueous cells employing an electrolyte containing, for example, aprotic alkylated amide solvents. The amalgamation of the surface of the anode is necessary to remove the protective film, such as an oxide film, usually formed on the surface of such anode materials as aluminum, magnesium, calcium and their alloys. It has been found that the protective oxide film renders these metals relatively inactive in nonaqueous electrolytes probably because the film is insoluble or impenetrable in this type of electrolyte. The removal or prevention of the formation of the protective oxide film on the surface of these materials makes them active in nonaqueous electrolytes, thus enabling them to be used as high energy density battery anodes. In addition, it has been found that when aluminum is amalgamated, the electrochemical properties are improved over that of the base metal aluminum.

Amalgamation from mercury salt solutions in water or an organic solvent or any suitable technique can be employed to amalgamate at least the surface of the anodes of this invention.

To demonstrate the necessity for amalgamation of the surface of the anode of this invention, pure aluminum, various aluminum alloys, amalgamated aluminum and amalgamated aluminum alloys were used as anodes in test or experimental nonaqueous cells. Specifically, each experimental cell was assembled and tested in an inert atmosphere using the following components:

- an anode as described in Table 1 measuring 1 inch (2.54 cm) by 1.5 inches (3.8 cm);
- a cathode mix spread onto an expanded nickel grid carrier measuring either 1 inch (2.54 cm) by 1.5 inches (3.8 cm) or 0.5 inch (1.27 cm) by 1.5 inches (3.8 cm), said cathode mix (2 grams) containing an active material, carbon as a conducting agent and a binder;
- 5 ml of an electrolyte of 1.5 M $NH_4NO_3$—DMF solution (DMF being dimethyl formamide); and
- a reference electrode of platinum which could be used to measure the anode or cathode potentials of the cell.

The above components were placed in a glass beaker producing an experimental cell in which various types of anodes were used as shown in Table 1. The open circuit voltage of the anode versus the platinum electrode was measured along with the anode voltage of the cell under various current drains. The data so obtained are shown in Table 1 and clearly demonstrate the poor electrochemical activity of pure unamalgamated aluminum and aluminum alloys in the nonaqueous cell. Contrary to this, amalgamated aluminum and aluminum alloys exhibited high electrochemical activity in the nonaqueous cell thereby confirming their use as high energy density anodes for nonaqueous cells.

TABLE I

| Test* Cell | Anode | UNAMALGAMATED Open Circuit Voltage (Volts) | AMALGAMATED | | | | | |
|---|---|---|---|---|---|---|---|---|
| | | | Open Circuit Voltage (Volts) | Current Drain 0.2 mA (Volts) | Current Drain 0.5 mA (Volts) | Current Drain 1.0 mA (Volts) | Current Drain 2 mA (Volts) | Current Drain 5 mA (Volts) |
| 1 | Pure Al sheet | + 0.1 | 1.29 | 1.28 | 1.27 | 1.24 | 1.18 | 1.16 |
| 2 | Al-5.5% Cu | — | 1.40 | 1.33 | 1.26 | 1.16 | 0.93 | — |
| 3 | Al-4.4%Cu-1.5%Mg | 0.02 | 1.16 | 1.04 | 0.97 | 0.77 | — | — |
| 4 | Al-2.5%Mg-0.25%Cu | 0.01 | 1.32 | 1.29 | 1.28 | 1.28 | 1.27 | 1.22 |
| 5 | Al-1.6%Cu-2.5%Mg-5.6%Zn | 0.01 | 1.04 | 0.97 | 0.94 | 0.91 | 0.88 | 0.75 |
| 6 | Al-4.2%Cu | 0.5 | 1.34 | 1.31 | 1.25 | 1.21 | 1.11 | 0.62 |
| 7 | Al-2.8%Li | 0.6 | 1.53 | 1.42 | 1.42 | 1.34 | 1.33 | — |
| 8 | Al-1.1%Zn-0.08%Hg | 0.0 | 1.43 | 1.52 | 1.52 | 1.52 | 1.52 | — |
| 9 | Al-0.15%Sn-0.1%Bi-0.02%Ga | 0.61 | 1.64 | 1.64 | 1.63 | 1.62 | 1.59 | 1.55 |

*all voltages are negative

Dependent upon the particular metal selected for the anode and the other components of the cell, the anode for use in this invention could be a powder metal body, an expanded metal grid or a metal screen, sheet or foil.

Cathodes for use in this invention include metal oxides, such as $MnO_2$, $V_2O_5$, $Ag_2O$, $HgO$, $Cu_2O$, $CuO$, $PbO_2$, $PbO$ or $Fe_2O_3$, and fluorides, such as polycarbonfluoride, i.e., $(CF_x)_n$, $CuF_2$ or $NiF_2$. Suitable $MnO_2$ materials would be $\alpha$-$MnO_2$, $\beta$-$MnO_2$, electrolytic $\gamma$-$MnO_2$, chemical $\gamma$-$MnO_2$ and heat-treated $MnO_2$.

Polycarbonfluoride compounds of the type to which cathodes of this invention refer have the general formula $(CF_x)_n$ wherein x represents the ratio of fluorine atoms to carbon atoms in the compound and n refers to an indefinite number of the recurring $(CF_x)$ groups. Generally, for most cell applications, x can vary between about 0.7 and about 1.3. Such polycarbonfluoride compounds may be prepared in accordance with known methods by reacting various forms of carbon, e.g., graphite, active carbon, carbon black, etc., with fluorine gas at elevated temperatures (e.g., 350° C.-400° C.).

The above cathode materials can be employed with or without conductive materials and with or without a binder as desired.

Electrolytes for use in this invention are solutions comprising a salt, preferably a lithium or ammonium salt, dissolved in an aprotic alkylated amide solvent with or without a cosolvent. Examples of aprotic alkylated amides are dimethyl formamide and dimethyl acetamide which are straight chain amides, and N-methyl pyrrolidone, which is a cyclic amide. These compounds have the following structural formulas:

linear (straight chain) amides where
R$_1$ = H, or an alkyl group of one to four carbon atoms
R$_2$, R$_3$ = an alkyl group of one to four carbon atoms cyclic amides where
R$_1$ = an alkyl group of one to four carbon atoms
H on the C$_3$, C$_4$ or C$_5$ position can be substituted by an alkyl or alkoxyl group of one to four carbon atoms Useful organic cosolvents employed alone or mixed with one or more other cosolvents for use in preparing electrolytes employed in the cell of this invention include the following classes of compounds:

Alkylene nitriles: e.g., crotonitrile (liquid range −51.1° C. to 120° C.)

Trialkyl borates: e.g., trimethyl borate, $(CH_3O)_3B$ (liquid range −29.3° C. to 67° C.)

Tetraalkyl silicates: e.g., tetramethyl silicate, $(CH_3O)_4Si$ (boiling point 121° C.)

Nitroalkanes: e.g., nitromethane, $CH_3NO_2$ (liquid range −17° C. to 100.8° C.)

Alkylnitriles: e.g., acetonitrile, $CH_3CN$ (liquid range −45° C. to 81.6° C.)

Aromatic phosphonic acid dihalides: e.g., benzene phosphonyl dichloride (boiling point 258° C.)

Monocarboxylic acid esters: e.g., ethyl acetate (liquid range −83.6° to 77.06° C.)

Orthoesters: e.g., trimethylorthoformate, $HC(OCH_3)_3$ (boiling point 103° C.)

Lactones: e.g., γ-(gamma)butyrolactone, (liquid range −42° to 206° C.)

Dialkyl carbonates: e.g., dimethyl carbonate, $OC(OCH_3)_2$ (liquid range 2° to 90° C.)

Alkylene carbonates: e.g., propylene carbonate, (liquid range −48° to 242° C.)

Monoethers: e.g., diethyl ether (liquid range −116° to 34.5° C.)

Polyethers: e.g., 1,1- and 1,2-dimethoxyethane (liquid ranges −113.2° to 64.5° C. and −58° to 83° C., respectively)

Cyclic ethers: e.g., tetrahydrofuran (liquid range −65° to 67° C.); 1,3-dioxolane (liquid range −95° to 78° C.)

Nitroaromatics: e.g., nitrobenzene (liquid range 5.7° to 210.8° C.)

Aromatic carboxylic acid halides: e.g., benzoyl chloride (liquid range 0° to 197° C.); benzoyl bromide (liquid range −24° to 218° C.)

Aromatic sulfonic acid halides: e.g., benzene sulfonyl chloride (liquid range 14.5° to 251° C.)

Aromatic thiophosphonic acid dihalides: e.g., benzene thiophosphonyl dichloride (boiling point 124° C. at 5 mm.)

Cyclic sulfones: e.g., sulfolane, (melting point 22° C.); 3-methylsulfolane (melting point −1° C.)

Alkyl sulfonic acid halides: e.g., methanesulfonyl chloride (boiling point 161° C.)

Alkyl carboxylic acid halides: e.g., acetyl chloride (liquid range −112° to 50.9° C.); acetyl bromide (liquid range −96° to 76.° C.); propionyl chloride (liquid range −94° to 80° C.)

Saturated heterocyclics: e.g., tetrahydrothiophene (liquid range −96° to 121° C.); 3-methyl-2-oxazolidone (melting point 15.9° C.)

Dialkyl sulfamic acid halides: e.g., dimethyl sulfamyl chloride (boiling point 80° C. at 16 mm.)

Alkyl halosulfonates: e.g., ethyl chlorosulfonate (boiling point 151° C.)

Unsaturated heterocyclic carboxylic acid halides: e.g., 2-furoyl chloride (liquid range −2° to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm)

Dialkyl sulfoxides: e.g., dimethyl sulfoxide (liquid range +18.4° to 189° C.)

Dialkyl sulfates: e.g., dimethylsulfate (liquid range −31.75° to 188.5° C.)

Dialkyl sulfites: e.g., dimethylsulfite (boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.).

The preferred cosolvents are acetonitrile; sulfolane; crotonitile; nitrobenzene; tetrahydrofuran; 1,3-dioxolane; 3-methyl-2-oxazolidone; propylene or ethylene carbonate; γ-butyrolactone; ethylene glycol sulfite; dimethylsulfite; dimethyl sulfoxide; and 1,2-dimethoxyethane. The best cosolvents are acetonitrile, 3-methyl-2-oxazolidone, propylene or ethylene carbonate, 1,2-dimethoxyethane, and 1,3-dioxolane because they appear more chemically inert to battery components and have wide liquid ranges, and especially because they permit highly efficient utilization of the cathode materials.

The ionizing solute for use in the invention may be a simple or double salt, i.e., lithium or ammonium salts, or mixtures thereof, such as $LiBF_4$ or $NH_4NO_3$, which will produce an ionically conductive solution when dissolved in one or more solvents. Useful solutes include complexes of inorganic or organic Lewis acids and inorganic ionizable salts. The only requirements for utility are that the salts, whether simple, i.e., ammonium nitrate ($NH_4NO_3$) or complex, i.e., $LiBF_4$, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, arsenic pentafluoride, zirconium tetrachloride, phosphorus pentafluoride, boron fluoride, boron chloride and boron bromide.

Ionizable salts useful in combination with the Lewis acids include lithium fluoride, lithium chloride, lithium bromide, lithium sulfide, ammonium fluoride, ammonium chloride, ammonium bromide, sodium fluoride, sodium chloride, sodium bromide, potassium fluoride, potassium chloride and potassium bromide. Preferably, lithium and ammonium salts which could be used in this invention are $LiBF_4$, $LiCF_3SO_3$, $LiAlCl_4$, $LiSbCl_6$, $LiAsF_6$, $LiPF_6$, $NH_4BF_4$, $NH_4NO_3$, $NH_4Cl$, $NH_4Br$, $NH_4SCN$ and $NH_4PF_6$.

A separator for use in a cell of this invention has to be chemically inert in the cell system and insoluble in the cell electrolyte and have a porosity so as to permit the liquid electrolyte to permeate through and contact the electrodes of the cell, thus establishing an ion transfer path between the anode and cathode.

The container housing for cells can be made of stainless steel, iron, nickel, nickel-plated steel or some other material that will not corrode or otherwise deteriorate when in contact with the cell materials.

The insulating member disposed between the cover and the can has to be stable in the presence of the cell components and can be selected from such materials as polytetrafluoroethylene (e.g., "Teflon"), fluorinated ethylenepropylene (e.g., FEP), ethylene copolymer with FEP (e.g., "Tefzel"), chlorotrifluoroethylene (e.g., "Kel-F"), perfluoro-alkoxy polymer (e.g., PFA), tetrafluoroethylene (TFE), polyvinyl, polyethylene, polypropylene, polystyrene, nylon, etc.

EXAMPLE I

Figure 1:
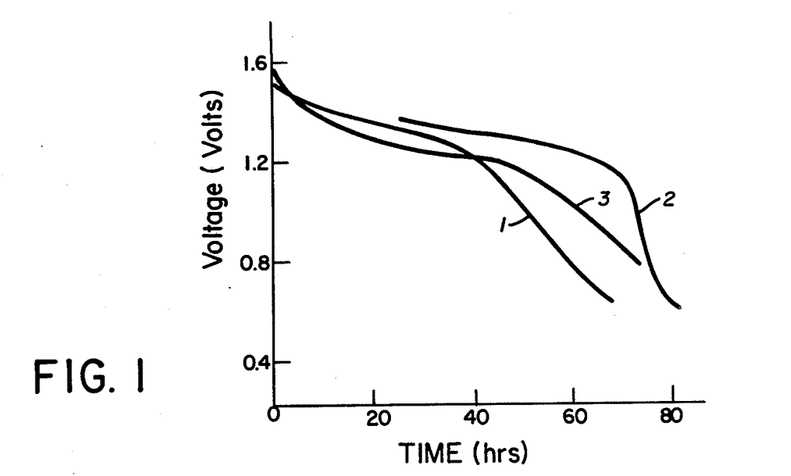
FIGS. 1 through 10 are graphs illustrating the discharge characteristics of different cells made in accordance with this invention.

Three experimental cells were constructed as described above using different amalgamated aluminum alloys as the anode, $MnO_2$ as the active cathode and 1.5M $NH_4NO_3$-DMF solution as the electrolyte. In an inert atmosphere, each cell was discharged on a 1mA drain and the voltage output versus time data were observed and are shown plotted as a curve in FIG. 1. Curves 1, 2 and 3 in FIG. 1 represent cells employing amalgamated aluminum alloy anodes of Al-0.15% Sn-0.1% Sb-0.01% Ga, Al-1.1% Zn-0.08% Hg and Al-2.8% Li, respectively. Although the Al-1.1% Zn-0.08% Hg alloy appeared to give the best performance, the data of all three cells clearly show that amalgamated aluminum alloys of this invention can be utilized as high energy density anodes for nonaqueous cells.

EXAMPLE II

Figure 2:
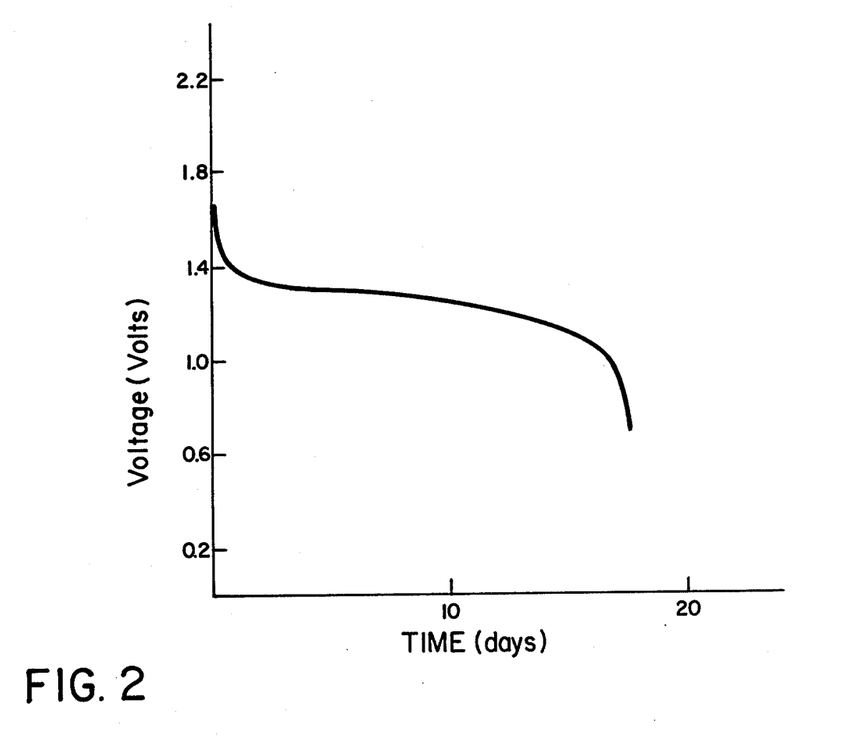

A flat-type cell was constructed utilizing a metal base having a shallow depression in which the cell contents were placed and a metal cap for sealing the cell. The contents of the cell consisted of a 6.45 square centimeter amalgamated aluminum anode, a 6.45 square centimeter $(CF_x)_n$ cathode wherein x was between 0.8 and 1, two ml of a 1.5M $NH_4NO_3$-DMF electrolyte, and a polypropylene separator. The cell was discharged at a current density of 0.16 $mA/cm^2$ and the voltage output versus time data were observed and are shown plotted as a curve in FIG. 2. As apparent from the data, an amalgamated aluminum anode in accordance with this invention can be utilized as a high energy density anode for a nonaqueous cell employing a $(CF_x)_n$ cathode.

EXAMPLE III

Figure 3:
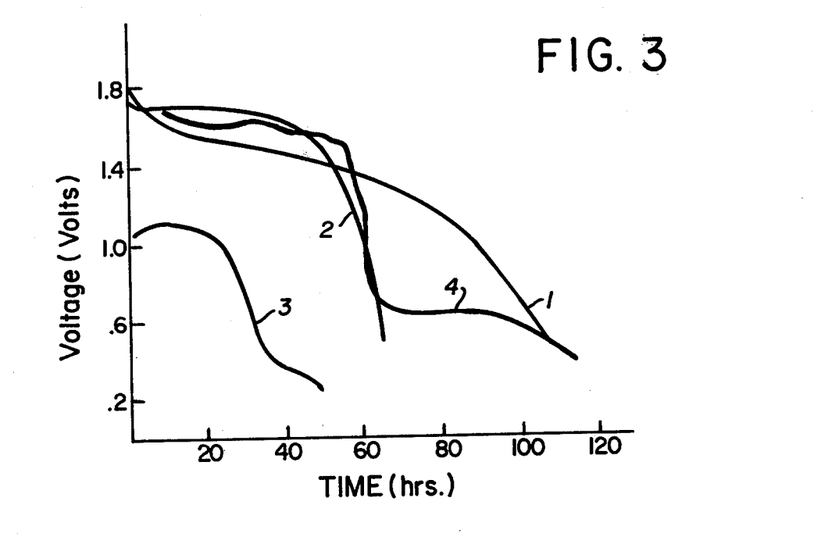

Using the same type of cell construction as in Example II, four flat-type cells were constructed using the same components except that the cathode employed in each cell was $MnO_2$, $V_2O_5$, HgO or $Ag_2O$. The cells were discharged at a current density of 0.16 $mA/cm^2$ and the voltage output versus time data for each cell were observed and are shown plotted as a curve in FIG. 3. The data for the $MnO_2$, $V_2O_5$, HgO and $Ag_2O$ cathode/amalgamated aluminum nonaqueous cells are shown plotted as curves 1 to 4, respectively. Again, these data clearly show that using the teaching of this invention, amalgamated aluminum anodes can be employed as high energy density anodes for use in nonaqueous cells employing a wide variety of cathodes.

EXAMPLE IV

Figure 4:
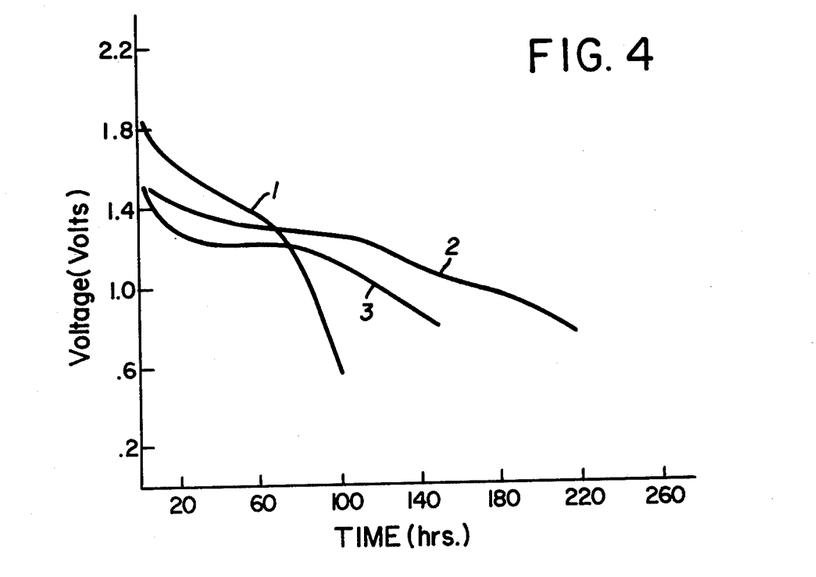

Using the same type of cell construction as in Example II, three flat-type cells were constructed using the same components except that the cathode employed in each cell was an untreated electrolytic $MnO_2$ with a polysulfone binder, a chemical γ-$MnO_2$ with a polytetrafluoroethylene binder, or a heat-treated electrolytic $MnO_2$ with a polysulfone binder. The cells were discharged at a current density of 0.16 $mA/cm^2$ and the voltage output versus time data for the cells were observed and are shown plotted as curves 1 to 3 in FIG. 4. The data for the untreated electrolytic $MnO_2$, chemical γ-$MnO_2$ and heat-treated electrolytic $MnO_2$ are shown plotted as curves 1 to 3, respectively, in FIG. 4. Again, these data show that amalgamated aluminum anodes of this invention can be utilized as high energy density anodes for nonaqueous cells employing various forms of $MnO_2$ as the cathode.

EXAMPLE V

Figure 5:
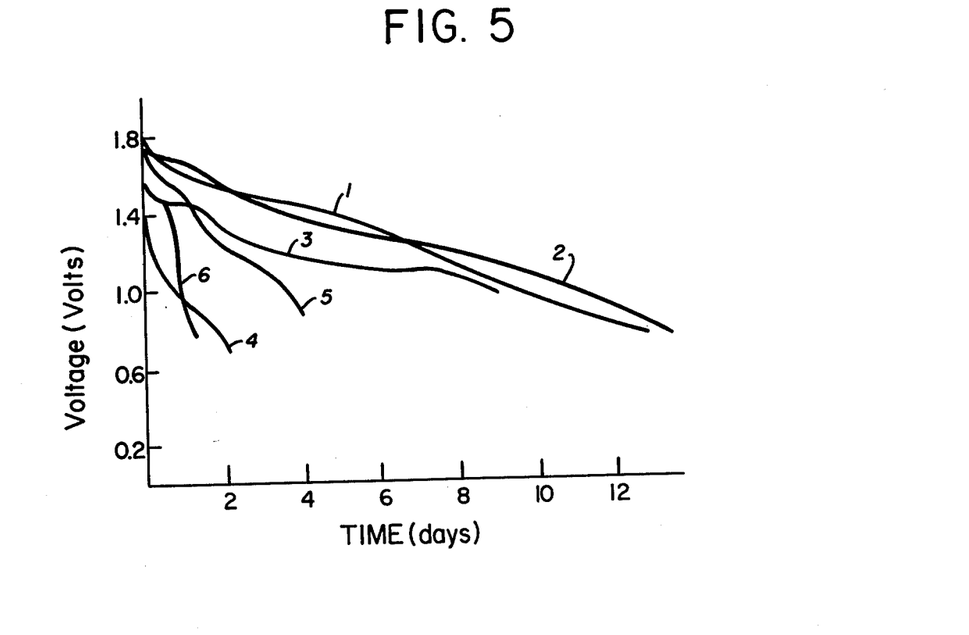

Using the same type of cell construction as in Example II, six flat-type cells were constructed using the same components except that a chemical γ-$MnO_2$ cathode containing a polysulfone binder was employed along with $LiBF_4$ dissolved in several different solvents. Solvents employed in cells 1 through 6 were dimethyl formamide (DMF), dimethyl acetamide (DMA), N-methyl pyrrolidone (MPD), dimethyl sulfoxide (DMSO), acetonitrile (AN), and crotonitrile (CN), respectively. The cells were discharged at a current density of 0.16 $mA/cm^2$ and the voltage output versus time data for cells 1 through 6 were observed and are shown plotted as curves 1 through 6 in FIG. 5. Again, these data show that amalgamated aluminum anodes of this invention can be utilized as high energy density anodes for nonaqueous cells employing solvents such as DMF, DMA and MPD in the electrolyte.

EXAMPLE VI

Figure 6:
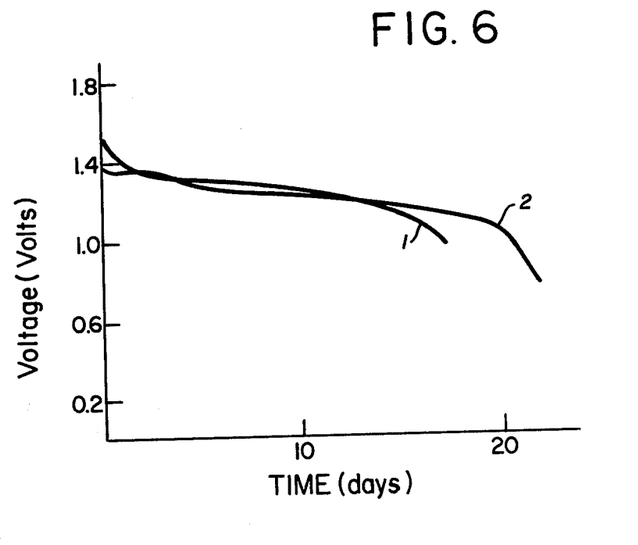

Two flat-type cells were constructed as described in Example II using the same components except that $(CF_x)_n$ with x between 0.8 and 1.0 was used as the cathode and an electrolyte was employed of $LiBF_4$-DMF alone (cell 1) or with a cosolvent of acetonitrile (cell 2). The cells were discharged at a current density 0.16 $mA/cm^2$ and the voltage output versus time data for cells 1 and 2 were observed and are shown plotted as curves 1 and 2 in FIG. 6. The data show that greater discharge capacity was obtained in the cell employing the cosolvent over the cell which did not have the cosolvent.

EXAMPLE VII

Figure 7:
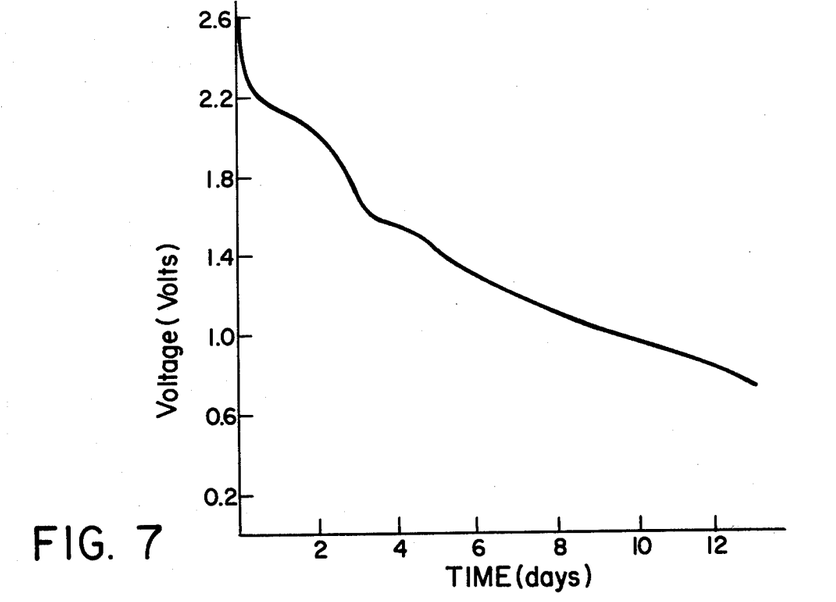

A flat-type cell was constructed as described in Example II using the same components except that an amalgamated magnesium anode and a chemical γ-$MnO_2$ containing a polysulfone binder were employed. The cell was discharged at a 0.16 $mA/cm^2$ current density and the voltage output versus time data are shown plotted as a curve in FIG. 7. The data shown in FIG. 7 clearly demonstrate that amalgamated magnesium anodes of this invention can be utilized as high energy density anodes for nonaqueous cells.

EXAMPLE VIII

Figure 8:
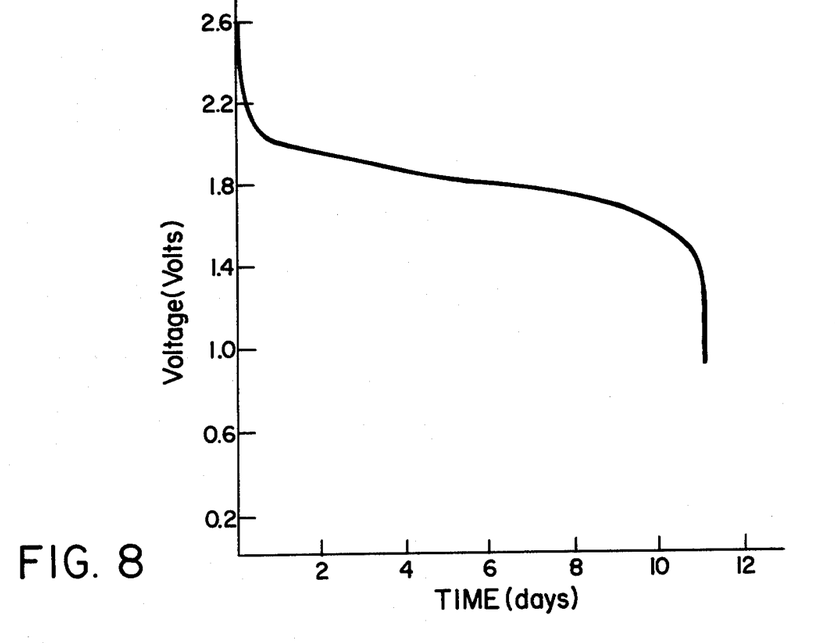

A similar type cell was constructed as in Example VII except that a $(CF_x)_n$ cathode, wherein x was between 0.8 and 1, was employed as the cathode. This cell was also discharged at a current density 0.16 $mA/cm^2$ and the voltage output versus time data are shown plotted as a curve in FIG. 8. Again, the data in FIG. 8 clearly demonstrate that amalgamated magnesium anodes of this invention can be utilized as anodes for nonaqueous cells utilizing $(CF_x)_n$ cathodes.

EXAMPLE IX

Figure 9:
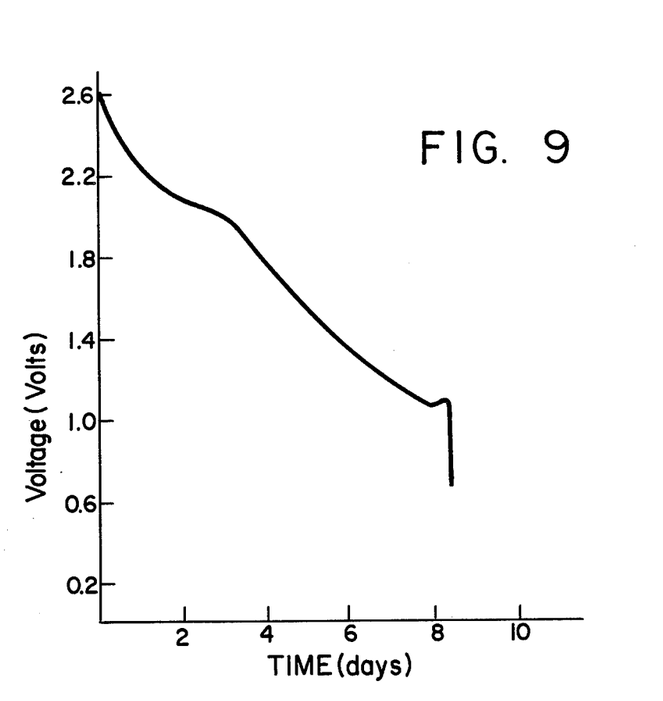

A flat-type cell was constructed as described in Example II using the same components except that an amalgamated calcium anode and a chemical γ-$MnO_2$ cathode containing a polysulfone binder were employed. The cell was discharged at a current density of 0.16 mA/cm$^2$ and the voltage output versus time data are shown plotted as a curve in FIG. 9. The data shown in FIG. 9 clearly demonstrates that amalgamated calcium anodes of this invention can be utilized as high energy density anodes for nonaqueous cells.

EXAMPLE X

Figure 10:
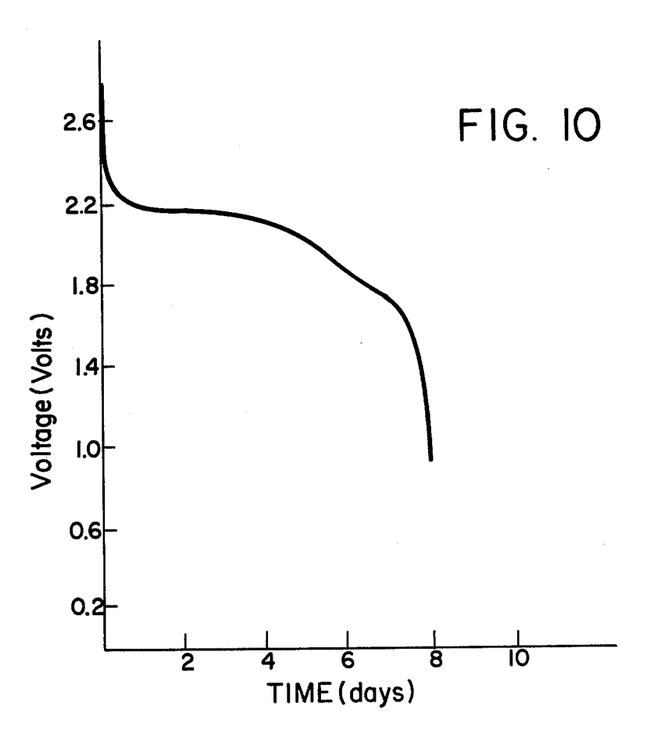

A similar type cell was constructed as in Example IX except that a $(CF_x)_n$, wherein x was between about 0.8 and 1, was employed as the cathode. As in the previous examples, this cell was dischaged at a current density of 0.16 mA/cm$^2$ and the voltage output versus time data are shown plotted as a curve in FIG. 10. Again, the data in FIG. 10 clearly demonstrate that amalgamated calcium anodes of this invention can be utilized as anodes for nonaqueous cells.

It should be understood that the foregoing disclosure relates to preferred embodiments of the invention and it is intended to cover all changes and modifications of the invention which do not depart from the spirit and scope of the appended claims.

What is claimed is:

1. A nonaqueous cell comprising an anode selected from the group consisting of aluminum, magnesium, calcium and their alloys, and wherein at least the surface of the anode is amalgamated; a solid cathode selected from the group consisting of $MnO_2$, $CuF_2$, $NiF_2$, $V_2O_5$, $Ag_2O$, HgO, $Cu_2O$, CuO, $PbO_2$, PbO, and $Fe_2O_3$; and an electrolyte solution comprising a salt dissolved in a nonaqueous solvent of an aprotic alkylated amide.

2. The nonaqueous cell of claim 1 wherein the salt is selected from the group consisting of lithium and ammonium salts.

3. The nonaqueous cell of claim 1 wherein the electrolyte contains an organic cosolvent.

4. The nonaqueous cell of claim 1 wherein the aprotic alkylated amide is selected from the group consisting of dimethyl formamide, dimethyl acetamide and N-methyl pyrrolidone.

5. The nonaqueous cell of claim 1 wherein the anode is amalgamated aluminum or aluminum alloy and the cathode is selected from the group consisting of $MnO_2$, $CuF_2$, $NiF_2$, $V_2O_5$, $Ag_2O$, HgO, $Cu_2O$, CuO, $PbO_2$, PbO, $(CF_x)_n$, and $Fe_2O_3$.

6. The nonaqueous cell of claim 1 wherein the anode is amalgamated magnesium or magnesium alloy and the cathode is selected from the group consisting of $MnO_2$, $CuF_2$, $NiF_2$, $V_2O_5$, $Ag_2O$, HgO, $Cu_2O$, CuO, $PbO_2$, PbO, and $Fe_2O_3$.

7. The nonaqueous cell of claim 1 wherein the anode is amalgamated calcium or calcium alloy and the cathode is selected from the group consisting of $MnO_2$, $V_2O_5$, $Ag_2O$, HgO, $Cu_2O$, CuO, $PbO_2$, PbO, $(CF_x)_n$, $Fe_2O_3$, $CuF_2$ and $NiF_2$.

8. The nonaqueous cell of claim 1 wherein the anode is amalgamated aluminum or aluminun alloy, the cathode is $MnO_2$, and the electrolyte is $LiBF_4$-dimethyl formamide.

9. The nonaqueous cell of claim 1 wherein the anode is amalgamated aluminum or aluminum alloy, the cathode is $(CF_x)_n$, and the electrolyte is $LiBF_4$-dimethyl formamide.

10. The nonaqueous cell of claim 1 wherein the anode is amalgamated aluminum or aluminum alloy, the cathode is $(CF_x)_n$, and the electrolyte is $LiBF_4$-dimethyl formamideacetonitrile.

11. The nonaqueous cell of claim 1 wherein the anode is amalgamated magnesium or magnesium alloy, the cathode is $MnO_2$, and the electrolyte is $LiBF_4$-dimethyl formamide.

12. The nonaqueous cell of claim 1 wherein the anode is amalgamated calcium or calcium alloy, the cathode is $(CF_x)_n$, and the electrolyte is $LiBF_4$-dimethyl formamide.

13. The nonaqueous cell of claim 1 wherein the anode is amalgamated calcium or calcium alloy, the cathode is $MnO_2$, and the electrolyte is $LiBF_4$-dimethyl formamide.

* * * * *

UNITED STATES PATENT AND TRADEMARK OFFICE
CERTIFICATE OF CORRECTION

PATENT NO. : 4,142,028
DATED : February 27, 1979
INVENTOR(S) : V. Z. Leger et al It is certified that error appears in the above-identified patent and that said Letters Patent are hereby corrected as shown below:

Claim 5 should read as follows:

5. A nonaqueous cell comprising an anode selected from the group consisting of aluminum or aluminum alloy and wherein at least the surface of the anode is amalgamated; a solid cathode selected from the group consisting of $MnO_2$, $CuF_2$, $NiF_2$, $V_2O_5$, $Ag_2O$, $HgO$, $Cu_2O$, $CuO$, $PbO_2$, $PbO$, $(CF_x)_n$, and $Fe_2O_3$; and an electrolyte solution comprising a salt dissolved in a nonaqueous solvent of an aprotic alkylated amide.

Claim 7 should read as follows:

7. A nonaqueous cell comprising an anode selected from the group consisting of calcium or calcium alloy and wherein the cathode is selected from the group consisting of $MnO_2$, $CuF_2$, $NiF_2$, $V_2O_5$, $Ag_2O$, $HgO$, $Cu_2O$, $CuO$, $PbO_2$, $PbO$, $(CF_x)_n$, and $Fe_2O_3$; and an electrolyte solution comprising a salt dissolved in a nonaqueous solvent of an aprotic alkylated amide.

UNITED STATES PATENT AND TRADEMARK OFFICE
CERTIFICATE OF CORRECTION

PATENT NO. : 4,142,028
DATED : February 27, 1979
INVENTOR(S) : V. Z. Leger et al It is certified that error appears in the above-identified patent and that said Letters Patent are hereby corrected as shown below:

Claim 9, line 1, delete "1" and add therefor -- 5 --.

Claim 10, line 1, delete "1" and add therefor -- 5 --.

Claim 12, line 1, delete "1" and add therefor -- 7 --.

Signed and Sealed this

Sixth Day of November 1979

[SEAL]

Attest:

RUTH C. MASON
Attesting Officer

LUTRELLE F. PARKER
Acting Commissioner of Patents and Trademarks